(12) United States Patent
Yu et al.

(10) Patent No.: US 8,837,390 B2
(45) Date of Patent: Sep. 16, 2014

(54) NETWORK ENTRY APPARATUS AND METHOD FOR RELAY STATION USING FULL DUPLEX IN MOBILE COMMUNICATION SYSTEM

(75) Inventors: Tak-Ki Yu, Gyeonggi-do (KR);
Young-Bin Chang, Gyeonggi-do (KR);
Yung-Soo Kim, Gyeonggi-do (KR);
Jung-Je Son, Gyeonggi-do (KR);
Seung-Hee Han, Gyeonggi-do (KR);
Sang-Boh Yun, Gyeonggi-do (KR);
Joo-Hyun Lee, Gyeonggi-do (KR);
Sung-Soo Hwang, Gyeonggi-do (KR);
Sung-Yoon Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 876 days.

(21) Appl. No.: 12/989,599

(22) PCT Filed: Apr. 23, 2009

(86) PCT No.: PCT/KR2009/002126
§ 371 (c)(1),
(2), (4) Date: Oct. 25, 2010

(87) PCT Pub. No.: WO2009/131388
PCT Pub. Date: Oct. 29, 2009

(65) Prior Publication Data
US 2011/0038283 A1    Feb. 17, 2011

(30) Foreign Application Priority Data

Apr. 23, 2008  (KR) .................. 10-2008-0037941
Apr. 9, 2009   (KR) .................. 10-2009-0030770

(51) Int. Cl.
*H04J 1/16*     (2006.01)
*H04B 7/155*    (2006.01)
*H04L 5/14*     (2006.01)
*H04W 28/16*    (2009.01)
*H04L 5/00*     (2006.01)

(52) U.S. Cl.
CPC .......... *H04L 5/1438* (2013.01); *H04B 7/15557* (2013.01); *H04L 5/0007* (2013.01); *H04W 28/16* (2013.01); *H04L 5/0091* (2013.01); *H04L 5/0064* (2013.01); *H04L 5/143* (2013.01)
USPC ........................................ 370/329; 455/423

(58) Field of Classification Search
USPC .................... 370/329, 332; 455/423
See application file for complete search history.

(56) References Cited

U.S. PATENT DOCUMENTS

| | | | | |
|---|---|---|---|---|
| 8,542,617 | B2* | 9/2013 | Choi et al. ............ | 370/296 |
| 2006/0025165 | A1* | 2/2006 | Tillet et al. ........... | 455/517 |
| 2007/0254586 | A1  | 11/2007 | Lee et al. | |
| 2008/0031128 | A1* | 2/2008 | Jang et al. ............ | 370/210 |
| 2008/0186950 | A1* | 8/2008 | Zhu et al. ............. | 370/350 |
| 2009/0196214 | A1* | 8/2009 | Li et al. ................ | 370/315 |

OTHER PUBLICATIONS

Written Opinion of the Int'l Searching Authority (Form PCT/ISA/237) (7 pages).

* cited by examiner

*Primary Examiner* — Mark Rinehart
*Assistant Examiner* — Matthew Hopkins
(74) *Attorney, Agent, or Firm* — The Farrell Law Firm, P.C.

(57) ABSTRACT

A network entry apparatus and method for a Radio Station (RS) using full duplex in a mobile communication system are provided. The method includes performing a capability negotiation procedure including a full duplex function with a BS, performing an authentication and registration procedure with the BS, and performing an operation parameter configuration procedure including a full duplex function with the BS.

20 Claims, 8 Drawing Sheets

NETWORK ENTRY APPARATUS AND METHOD FOR RELAY STATION USING FULL DUPLEX IN MOBILE COMMUNICATION SYSTEM

TECHNICAL FIELD

The present invention relates to an apparatus and method for a network entry process, a capability negotiation process, and parameter configuration process for the network entry process and the capability negotiation process in a full duplex Relay Station (RS) in a mobile communication system.

Further, the present invention relates to an apparatus and method for an initial negotiation procedure and message exchange during operation in which, in order to efficiently operate, a full duplex RS measures an Error Vector Magnitude (EVM) of a transmit signal not eliminated depending on a transmit power and a resource allocation size and a Base Station (BS) determines the maximum transmit power and the maximum resource allocation size of the RS.

BACKGROUND ART

In a cell based wireless communication system, a coverage hole is generated because of a local characteristic of an environment of each area, a building, etc. In order to address this, a repeater is additionally installed for a service. However, there is a problem that the repeater causes performance deterioration resulting from noise amplification.

So, as an evolved type of the repeater, a Relay Station (RS) not simply amplifying but decoding and forwarding a signal from a Base Station (BS) has been proposed.

This RS is being actively researched for the purpose of the improvement of a throughput of a cell based wireless communication system and the expansion of a coverage. A standardization work for practical use is underway in the Institute of Electrical and Electronics Engineers (IEEE) 802.16j.

An RS system now taken into consideration in IEEE 802.16j and RS related research field is of a half duplex mode. The RS system is of a structure of not simultaneously performing reception and transmission within the same frequency resource region but dividing time and performing only one operation at a time.

In this case, there is a need for two signal transmissions such as signal transmission on communication between a BS and an RS and signal transmission on communication between the RS and an MS.

Compared to a single hop system, this inevitably requires twice of resource consumption and reduces spectrum efficiency, and additionally requires a transmission/reception switching time of the RS.

Also, at a BS standpoint, there is a problem that ineffectiveness having to separately transmit broadcast information for the RS occurs, and an UpLink (UL) coverage of single hop users serviced by the BS reduces because of dividing and using an RS link and an access link by time.

In order to address these problems, a structure in which an RS simultaneously performs transmission and reception using two antennas has been proposed. The RS performing this is called a full duplex RS.

However, a full duplex RS system has a problem that a standard support technology development for this and a research on a case to coexist with a half duplex RS system are unsatisfied.

In actual, a transmit signal fed back from a transmit antenna is distorted by a characteristic (i.e., non-linearity, etc.) of an Intermediate Frequency (IF)/Radio Frequency (RF) device including an amplifier and the transmit signal is received by a receive antenna. Thus, no matter how accurate interference channel estimation is, the transmit signal cannot be eliminated perfectly.

That is, an antenna interference signal of a full duplex RS not includes only a transmit signal but includes an EVM. The EVM is a transmit end error generated while passing through an IF, an RF, an amplifier, etc by a variety of kinds of a non-linear distortion, a Common Phase Error (CPE), an Inter-Modulation Distortion (IMD), etc.

An error generated at a transmit end in this manner is generically called an EVM. The EVM can vary depending on an IF/RF characteristic of the maximum transmit power, the maximum resource allocation size, a CPE, etc., and an amplifier characteristic such as back-off, etc. That is, the EVM varies depending on IF/RF and amplifier non-linear characteristics of a full duplex RS, a resource allocation region in full duplex, a back-off value of an amplifier according to the maximum transmit power, and a CPE/IMD improvement algorithm. And, the EVM corresponds to a component, which cannot be estimated and eliminated, among RS transmit signals and thus, becomes a factor limiting interference cancelation performance.

Accordingly, there is a problem that, if the BS determines only a full duplex support or non-support in an RS initial access process and working process, it cannot determine the maximum resource allocation region allocatable to the full duplex RS and, if the BS performs power control without considering an EVM, the full duplex performance of the RS is deteriorated.

Particularly, as a transmit power of an RS and a resource allocated to the full duplex RS increase, an EVM also increases and therefore, there is a problem that, although a feedback interference of a transmit signal is canceled through an interference cancelation algorithm, upon receipt of a signal from the BS, performance deterioration may occur.

Accordingly, there is a need for an initial negotiation procedure and a message exchange process during operation in which, in order to efficiently operate, a full duplex RS measures an EVM of a transmit signal not eliminated depending on a transmit power and a resource allocation size and a BS determines the maximum transmit power and the maximum resource allocation size.

DISCLOSURE OF INVENTION

Technical Solution

An aspect of exemplary embodiments of the present invention is to substantially address at least the above problems and/or disadvantages and to provide at least the advantages below.

Accordingly, one aspect of exemplary embodiments of the present invention is to provide an apparatus and method for network entry of a Relay Station (RS) using a full duplex mode in a mobile communication system.

Another aspect of exemplary embodiments of the present invention is to provide an apparatus and method for a network entry process, a capability negotiation process, and configuration for this that can effectively support a full duplex RS in a mobile communication system.

A further aspect of exemplary embodiments of the present invention is to provide an apparatus and method for eliminating an Error Vector Magnitude (EVM) generated in an Intermediate Frequency (IF)/Radio Frequency (RF) and transmit-end amplifier of an RS of a mobile communication system.

Yet another aspect of exemplary embodiments of the present invention is to provide an apparatus and method in which an RS measures and exchanges an EVM value in an initial capability negotiation process with a Base Station (BS) and, on need in working, mutually exchanges the EVM value with the BS or makes use of the EVM value in the RS itself, and uses the EVM value in resource allocation, power control, etc. between the RS and a Mobile Station (MS) (or a subordinate station), thus enhancing efficiency in a mobile communication system.

The above aspects are achieved by providing a network entry apparatus and method for an RS using full duplex in a mobile communication system.

According to one aspect of exemplary embodiments of the present invention, a network entry method of an RS using a full duplex mode is provided. The method includes performing a capability negotiation procedure including a full duplex function with a BS, performing an authentication and registration procedure with the BS, and performing an operation parameter configuration procedure including a full duplex function with the BS.

According to another aspect of exemplary embodiments of the present invention, an apparatus of an RS using a full duplex mode is provided. The apparatus includes a receiver, a controller, and a transmitter. The receiver extracts control information from a received control message. The controller performs a capability negotiation procedure including a full duplex function with a BS using the control information, performs an authentication and registration procedure with the BS, and performs an operation parameter configuration procedure including a full duplex function with the BS. The transmitter receives information output by the controller and generates and transmits a control message.

According to a further aspect of exemplary embodiments of the present invention, a method of a BS for network entry of an RS using a full duplex mode is provided. The method includes performing a capability negotiation procedure including a full duplex function with the RS, performing an authentication and registration procedure with the RS, and performing an operation parameter setting procedure including a full duplex function with the RS.

According to yet another aspect of exemplary embodiments of the present invention, an apparatus of a BS for network entry of an RS using a full duplex mode is provided. The apparatus includes a receiver, a controller, and a transmitter. The receiver extracts control information from a received control message. The controller performs a capability negotiation procedure including a full duplex function with the RS using the control information, performs an authentication and registration procedure with the RS, and performs an operation parameter setting procedure including a full duplex function with the RS. The transmitter receives information output by the controller and generates and transmits a control message.

Other aspects, advantages and salient features of the invention will become apparent to those skilled in the art from the following detailed description, which, taken in conjunction with the annexed drawings, discloses exemplary embodiments of the invention

BRIEF DESCRIPTION OF DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary.

Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

An apparatus and method for network entry of a Relay Station (RS) using full duplex in a mobile communication system according to an exemplary embodiment of the present invention are described below.

And, proposed is a technology for performing an additional capability negotiation process considering an Error Vector Magnitude (EVM) in a full duplex RS according to an exemplary embodiment of the present invention.

Also, proposed is a scheme of, on need, measuring an EVM and making use of the EVM at the time of RS working. That is, if an RS determines to use a full duplex relay function, here, the RS considers the influence of an EVM and additionally performs a full duplex related capability negotiation process and, on need, implements an additional use even during operation.

In an exemplary embodiment of the present invention, an RS may determine frame configuration, resource allocation, transmit power, etc. between a BS and the RS on the basis of full duplex relay function information and an EVM value that are identified in an initial capability negotiation process and during operation.

In an exemplary embodiment of the present invention, a full duplex RS represents a 'dual radio in-band' RS for simultaneously performing communication with an upper node and a lower node using two antennas at the same frequency.

In an exemplary embodiment of the present invention, an RS reuses all resources using two antennas while simultaneously performing transmission and reception. In this case, interference between the antennas may take place. This interference refers to interference between the two antennas in the same RS.

However, the RS is aware of a transmit signal and thus, can eliminate an interference signal from a signal of a receive antenna. Interference cancelation can be performed through two steps: RF end interference cancelation and baseband interference cancelation.

A relay mode of the RS is a half duplex RS mode taken into much consideration in the conventional art and a full duplex RS mode proposed in recent years. In order to effectively support a full duplex RS based on the current IEEE 802.16j standards, it is required to add a frame structure for this. This is supportable with almost no standard change by recycling a legacy IEEE 802.16e frame structure.

However, because a frame structure supported and a resource allocation scheme vary depending on whether a relay mode is half duplex or full duplex, on initial network entry, the RS has to exchange information on this between a BS and the RS and, based on this, implement a network entry process.

Also, even in an RS network reentry process, or in an RS parameter configuration process that, on need for configuration during an operation of the RS, exchange of information on whether a mode of the RS is a half duplex mode or a full duplex mode is required.

Accordingly, a technology to be proposed in an exemplary embodiment of the present invention is an RS network entry procedure including a process of, when an RS initially gains access to a BS, requesting and identifying each other related information through a capability negotiation and operation parameter configuration process for a full duplex function support of the RS.

On the basis of RS function information identified in an initial capability negotiation process, the BS may identify a full duplex support or non-support of the RS, and performs frame configuration and resource allocation between the BS and the RS. Also, the BS can perform a control for a full duplex related operation mode of the RS in a parameter configuration process.

An exemplary embodiment of the present invention includes the following processes:

a process of, when an RS initially gains access to a BS, performing a capability negotiation for a full duplex RS function support of the RS;

a process of performing setting for a full duplex function in a parameter configuration process of the RS with the BS; and an RS network entry process including the capability negotiation and parameter configuration process regarding the full duplex function.

For this, an exemplary embodiment of the present invention proposes a capability negotiation related Media Access Control (MAC) message defined between the RS and the BS for a full duplex relay function support between the RS and the BS.

Through this, the BS identifies if the RS performing network entry is in a half duplex mode or a full duplex mode, performs mode setting for the RS, and, according to this, performs suitable frame structure and resource allocation.

First, a full duplex capability negotiation procedure of the RS is described below.

Figure 1:
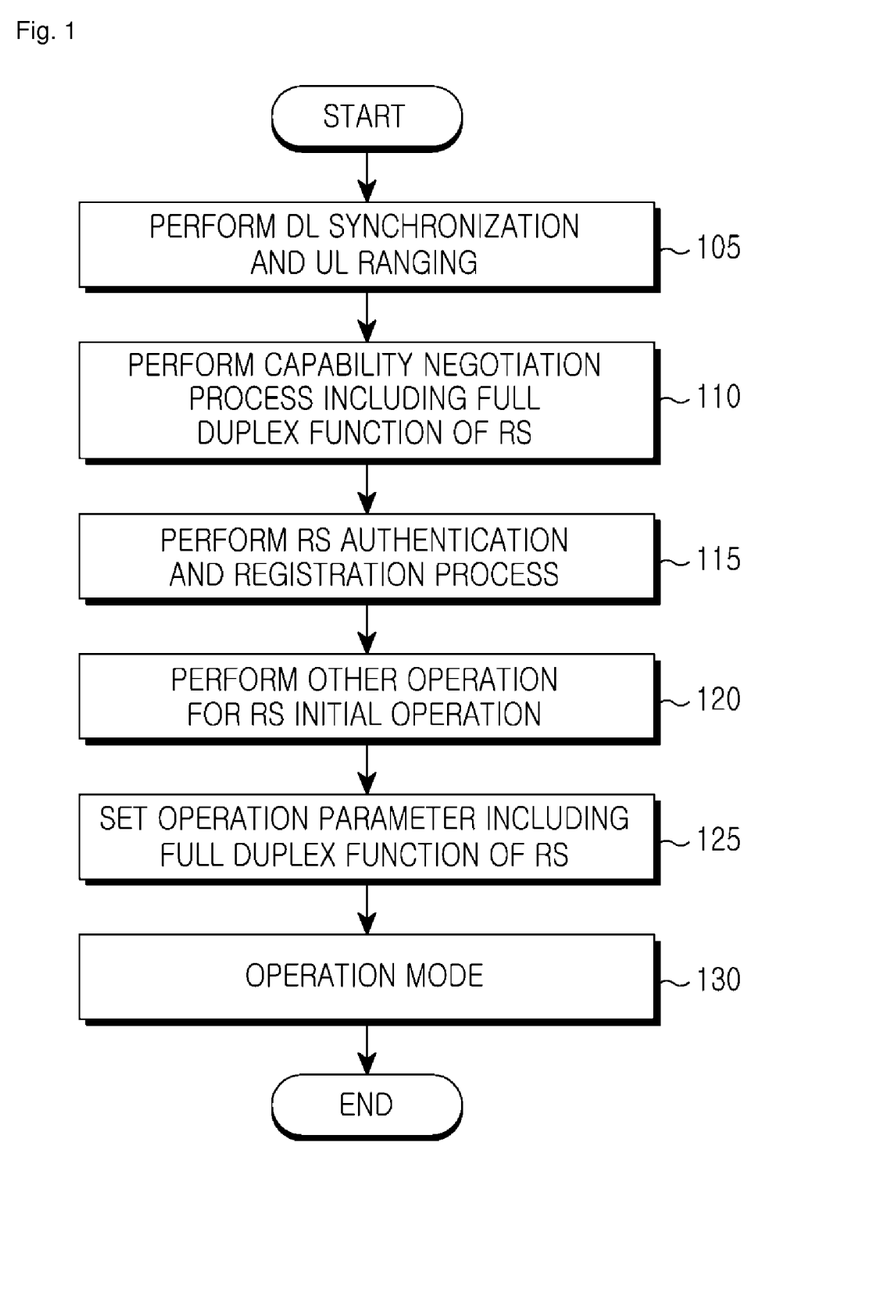
FIG. 1 is a flow diagram illustrating an initial network entry procedure of a Relay Station (RS) according to an exemplary embodiment of the present invention.

FIG. 1 is a flow diagram illustrating an initial network entry procedure of an RS according to an exemplary embodiment of the present invention.

Referring to FIG. 1, firstly, in step 105, an RS performs synchronization acquirement and ranging using a DownLink (DL) of a BS. After synchronization acquirement is completed, in step 110, the whole capability negotiation process including a full duplex related capability negotiation process of the present invention is performed. Through this, the BS and the RS can determine whether to operate in any mode.

After the capability negotiation process is completed, an RS authentication and registration procedure is performed in step 115. Then, a remaining necessary process defined in the standard (e.g., the IEEE 802.16j) to be applied to the RS is performed in step 120. Then, the RS finally sets an RS operation related parameter in step 125, and transits to an operation mode in step 130. A sequence of each process is variable depending on the system standard applied.

For the full duplex function related capability negotiation process of FIG. 1, a definition of a related MAC message between the BS and the RS is required.

Secondly, a MAC message in the full duplex related capability negotiation process of the RS is described below.

The MAC message is comprised of two types of a request and a response as below.

The first is an 'RS_Capability_REQ' message. This message is a capability negotiation request message including full duplex related information of the RS.

The second is an 'RS_Capability_RSP' message. This message is a capability negotiation response message including full duplex related information of the RS.

Regarding the above messages, a procedure is performed in such a manner that, if one of a BS and an RS requests information for the purpose of capability negotiation of the RS, the other responds.

An exemplary embodiment of the present invention proposes a capability negotiation MAC message format including full duplex function related information.

When the RS transmits a request message, the RS transmits an 'RS_Capability_REQ' message including information on its own full duplex support or non-support to a BS. The BS receiving this transmits an 'RS_Capability_RSP' message to the RS in response to this.

Here, a message field for full duplex support information for performing the capability negotiation procedure of the present invention is configurable in various formats. In the present invention, an exemplary implementation expressed in a 1-bit binary or 2-bit bitmap format is described below.

Thirdly, a parameter configuration procedure for a full duplex related operation of the RS is described below.

In the network entry procedure of FIG. 1, an operation parameter configuration process including a full duplex function of the RS is a process in which the BS determines an operation mode of the RS.

The BS determines and notifies the operation mode of the RS on the basis of information on a full duplex support function of the RS identified in a previous capability negotiation process, and it is transmitted in a control message format of performing parameter configuration defined in an 'RS_Config-CMD'.

If the RS receives the parameter configuration message (RS_Config-CMD), the RS identifies full duplex related information included in this message and sets an operation mode suitable to this. And, the RS transmits an ACKnowledgement (ACK) signal as a response to the BS and informs the BS of successfully receiving information.

A case in which the above process is applied to the IEEE 802.16j standard is described below.

For this, firstly, a full duplex related capability negotiation and parameter configuration process is described below.

Figure 2:
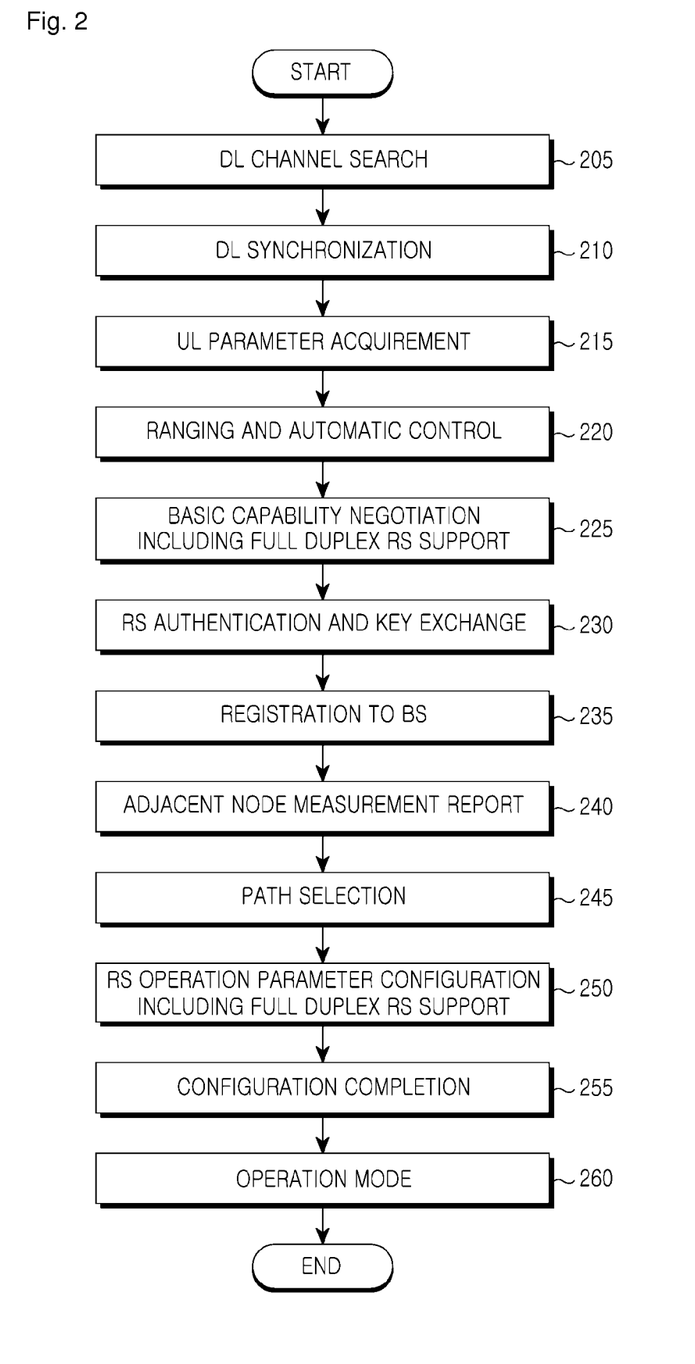
FIG. 2 is a flow diagram illustrating an initial network entry procedure of an RS based on the Institute of Electrical and Electronics Engineers (IEEE) 802.16j standards according to an exemplary embodiment of the present invention.

FIG. 2 is a flow diagram illustrating an initial network entry procedure of an RS based on the IEEE 802.16j standard according to an exemplary embodiment of the present invention.

Referring to FIG. 2, this procedure is similar with a general procedure described in FIG. 1.

First, an RS searches a DownLink (DL) in step 205, performs synchronization acquirement in step 210, acquires UpLink (UL) frame information and parameter in step 215, and performs ranging in step 220.

After synchronization acquirement is completed, a capability negotiation process is performed. Herein is included a full duplex related capability negotiation process of step 225 proposed in an exemplary embodiment of the present invention. Even various operation modes of the RS defined in the IEEE 802.16j standard can be performed as in the capability negotiation process.

After the capability negotiation process is completed, an authentication (including key exchange) and registration process of the RS are performed in steps 230 and 235, a signal measurement and report process for an adjacent node is performed in step 240, and a path selection process of the RS is performed in step 245.

Finally, RS operation parameter setting is performed. Even herein, included is a full duplex related information setting process proposed in an exemplary embodiment of the present invention in step 250. The RS finally finishes an operation parameter in step 255 and transits to an operation mode in step 260.

Secondly, a MAC message in a full duplex related capability negotiation process is described below.

In order to perform a full duplex capability negotiation process proposed in an exemplary embodiment of the present invention, the following capability negotiation related MAC message can be used based on the IEEE 802.16j standard.

First, an SS and RS Basic Capability Request (SBC-REQ) is a request message, and an SS and RS Basic Capability Response (SBC-RSP) is a response message responsive to this.

In order to perform a procedure proposed in an exemplary embodiment of the present invention within the IEEE 802.16j standard, a full duplex RS support information field is proposed using PHYsical (PHY) feature support related Type, Length, and Value (TLV) encoding for SBC-REQ, SBC-RSP messages, as in Tables 1 and 2.

TABLE 1

| Type | Length | Value | Scope |
|---|---|---|---|
| 206 | 1 | Bit #0: Access zone preamble transmission support | SBC-REQ |
| | | Bit #1: MBS Data Synchronization with predefined relative transmission time | SBC-RSP |
| | | Bit #2: MBS data synchronization with target transmission time | |
| | | Bit #3: cooperative relay support | |
| | | Bit #4: full duplex relay support | |
| | | Bits #5-7: Reserved | |

Table 1 illustrates a first example of a message construction for full duplex RS related capability negotiation in the IEEE 802.16j. Table 1 uses a 1-bit binary expression method.

Table 1 illustrates a full duplex RS support or non-support by specifying a value of '0' or '1' in a 'Bit #4' that is a full duplex RS support information field, and can distinguish mode information as follows.

If Bit #4=0, it represents a half duplex RS. If Bit #4=1, it represents a full duplex RS.

TABLE 2

| Type | Length | Value | Scope |
|---|---|---|---|
| 06 | 1 | Bit #0: Access zone preamble transmission support | |
| | | Bit #1: MBS Data Synchronization with predefined relative transmission time | SBC-REQ |
| | | Bit #2: MBS data synchronization with target transmission time | SBC-RSP |
| | | Bit #3: cooperative relay support | |
| | | Bit #4: out-of-band relay support | |
| | | Bit #5: dual radio relay support | |
| | | Bits #6-7: Reserved | |

Table 2 illustrates a second example of a message construction for full duplex RS related capability negotiation in the IEEE 802.16j. Table 2 uses a 2-bit bitmap expression method.

In this case, information on a full duplex RS of the present invention, that is, not only a 'dual radio in-band' RS mode but also an 'out-of-band' RS mode is also expressible. That is, mode information distinguishment can be done as follows. Here, the 'out-of-band' RS represents using a different frequency.

If Bit #4=0 and Bit #5=0, it represents a 'single radio in-band' RS. If Bit #4=0 and Bit #5=1, it represents a 'dual radio in-band' RS (i.e., a full duplex RS of the present invention).

If Bit #4=1 and Bit #5=0, it represents a 'single radio in-band' RS. If Bit #4=1 and Bit #5=1, it represents a 'dual radio out-of-band' RS.

Information on a remaining field of a MAC message for capability negotiation represents contents for RS PHY related functions supported in the IEEE 802.16j.

Figure 3:
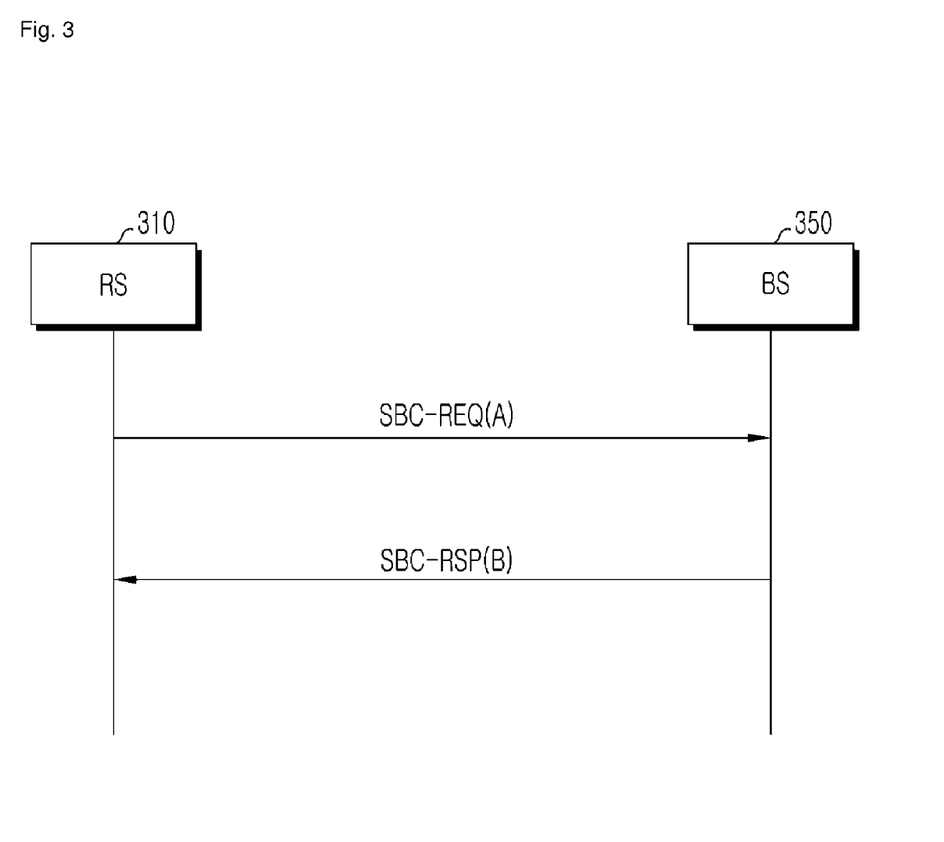
FIG. 3 is a ladder diagram illustrating a message flow in a capability negotiation process according to an exemplary embodiment of the present invention.

FIG. 3 is a ladder diagram illustrating a message flow in a capability negotiation process according to an exemplary embodiment of the present invention.

Referring to FIG. 3, in a capability negotiation process, an RS 310 transmits an SBC-REQ message including information on its own full duplex support or non-support to a BS 350 (step a). The BS 350 receiving this transmits an SBC-RSP message to the RS 310 in response to this (step b).

A value representing a duplex mode of the RS 310 is set to a fourth bit (in the case of one bit) of a PHY feature support related TLV of the SBC-REQ message, and a fourth bit and fifth bit (in the case of two bits).

After the BS 350 receives the SBC-REQ message, if recognizing the duplex mode of the RS 310, sets the same value as that of the SBC-REQ message to the PHY feature support related TLV.

Figure 4:
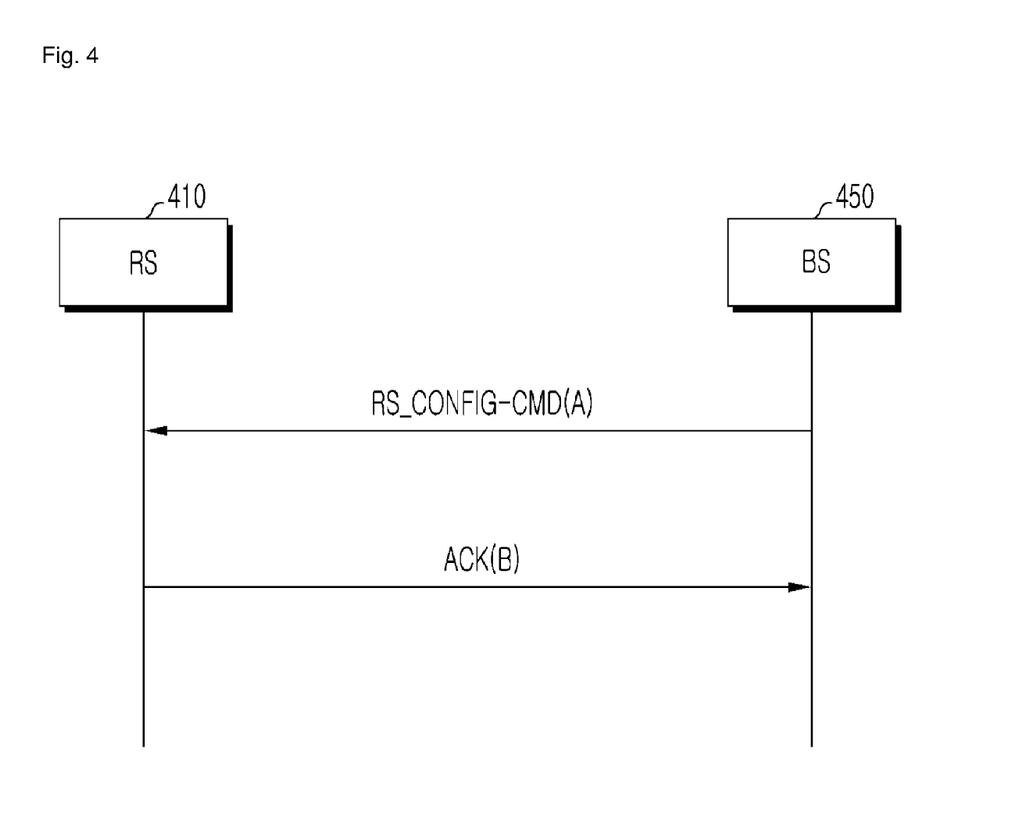
FIG. 4 is a ladder diagram illustrating a message flow in a parameter configuration process according to an exemplary embodiment of the present invention.

FIG. 4 is a ladder diagram illustrating a message flow in a parameter configuration process according to an exemplary embodiment of the present invention.

The process of FIG. 4 represents an operation parameter configuration step including a full duplex function of an RS 410 in a network entry procedure. This is a process in which a BS 450 determines an operation mode of the RS 410.

At this time, the BS 450 determines and notifies the operation mode of the RS 410 on the basis of information on a full duplex support function of the RS 410 identified in a previous capability negotiation process. This is transmitted in a parameter configuration message format defined as an 'RS_Config-CMD' (step a).

If the RS 410 receives this parameter configuration message, the RS 410 identifies full duplex related information included in the 'RS_Config-CMD' message and, suitably to this, sets an operation mode. And, the RS 410 transmits an ACK signal to the BS 450 and informs of receiving information (step b).

Figure 5:
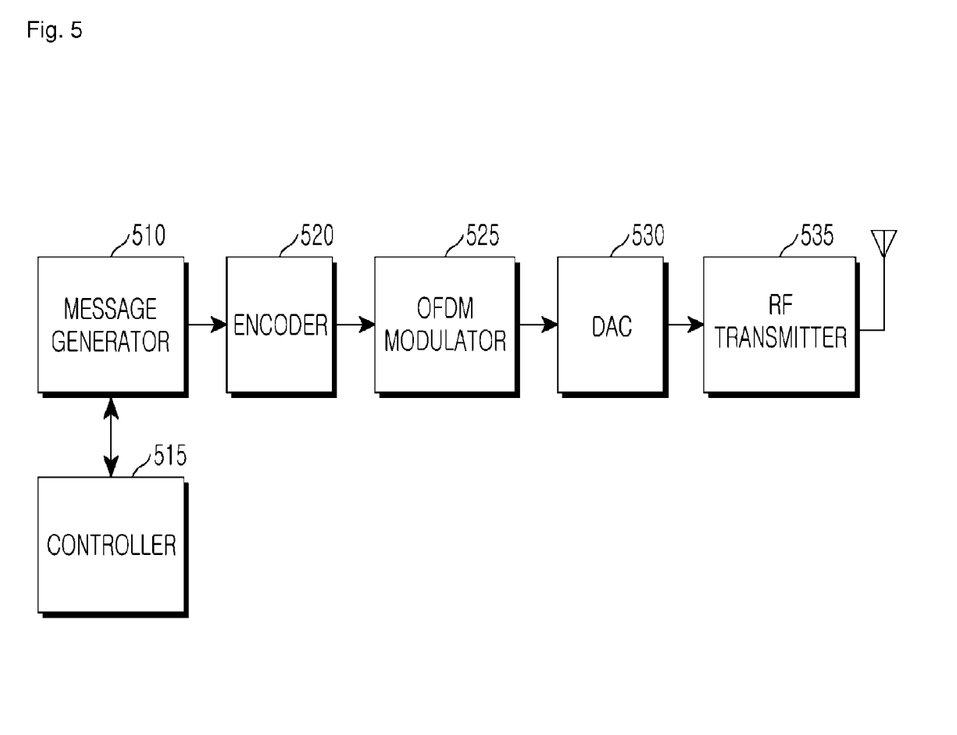
FIG. 5 is a block diagram illustrating a construction of a transmitter according to an exemplary embodiment of the present invention.

FIG. 5 is a block diagram illustrating a construction of a transmitter according to an exemplary embodiment of the present invention.

Referring to FIG. 5, constructions of an RS and a BS are described below. A transmitter of the BS and RS according to the present invention includes a controller 515, a message generator 510, an encoder 520, an Orthogonal Frequency Division Multiplexing (OFDM) modulator 525, a Digital to Analog Converter (DAC) 530, and a Radio Frequency (RF) transmitter 535.

The controller 515 performs a corresponding process on the basis of information from the message generator 510. Also, if there is a need to transmit a control message, the controller 515 generates and provides corresponding information (i.e., full duplex function information and EVM related information) to the message generator 510.

The message generator 510 generates a message with various kinds of information provided from the controller 515 and outputs the message to the encoder 520 of a physical layer.

The encoder 520 encodes and modulates data from the message generator 510 according to a predefined modulation level (i.e., a Modulation Coding Scheme (MSC) level).

The OFDM modulator 525 processes, by Inverse Fast Fourier Transform (IFFT), the data from the encoder 520 and outputs sample data (i.e., an OFDM symbol).

The DAC 530 converts the sample data into an analog signal.

The RF processor 535 converts the analog signal from the DAC 530 into an RF signal and transmits the converted RF signal through an antenna.

In the aforementioned construction, the controller 515, which is a protocol controller, controls the message generator 510. That is, the controller 515 can perform a function of the message generator 510.

These are separately constructed and shown in order to distinguish and describe respective functions in the present invention. Thus, in an actual realization, construction can be such that all of them are processed in the controller 515, and construction can be such that only part of them is processed in the controller 515.

The RS is now described with reference to FIG. 5. The RS searches a DL channel, receives a preamble signal of a BS, acquires synchronization, receives necessary messages (i.e., a MAP message, a Downlink Channel Descriptor (DCD), an Uplink Channel Descriptor (UCD), etc.), and acquires various kinds of physical layer information necessary for communication.

In a capability negotiation process, if there is a need to transmit a control message, the controller 515 provides corresponding information (i.e., full duplex function information and EVM related information) to the message generator 510.

The message generator 510 receives the corresponding information, generates a corresponding control message (i.e., an SBC-REQ) including this, and outputs the generated control message to the encoder 520.

Also, at the time of parameter configuration, if the controller 515 succeeds in receiving and analyzing a control message (i.e., an RS_Config-CMD) transmitted by the BS, the controller 515 provides this fact to the message generator 510.

The message generator 510 receives the success fact, generates a corresponding control message (ACK), and outputs the generated control message to the encoder 520.

If using a distribution scheduling technique, the controller 515 can reset RS use resource, power, etc. using an EVM measurement result. Alternately, if using a centralized scheduling technique, the controller 515 provides an EVM measurement result to the message generator 510, allows provision to a BS, receives information on use resource, power, etc. depending on the EVM measurement result, and applies corresponding information.

Referring now to FIG. 5, the BS is described below. In a capability negotiation process, if succeeding in receiving and analyzing a control message (i.e., an SBC-REQ) transmitted by the RS, the controller 515 provides its result to the message generator 510.

If there is a resource allocation request considering an EVM in an initial negotiation process from the RS (or, if the RS uses the centralized scheduling technique), the controller 515 can set (or reset) RS use resource, power, etc. using the EVM measurement result of the RS, provide corresponding information to the message generator 510, and allow provision to the RS.

The message generator 510 receives the result, generates a corresponding response message (i.e., an SBP-RSP), and outputs the response message to the encoder 520.

Also, at the time of parameter configuration, if there is a portion to be transmitted to a control station and changed, the controller 515 provides information on this to the message generator 510.

The message generator 510 receives information for the change, and generates and outputs a corresponding control message (RS_Config-CMD) to the encoder 520.

Figure 6:
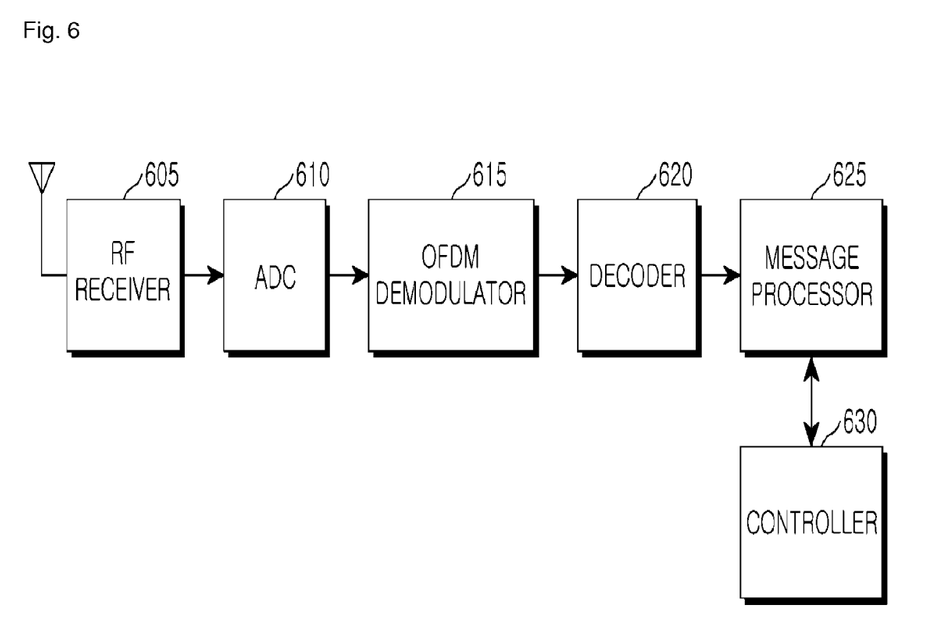
FIG. 6 is a block diagram illustrating a construction of a receiver according to an exemplary embodiment of the present invention.

FIG. 6 is a block diagram illustrating a construction of a receiver according to an exemplary embodiment of the present invention.

Referring to FIG. 6, constructions of an RS and a BS are described. A receiver of the BS and RS according to the present invention includes an RF receiver 605, an ADC 610, an OFDM demodulator 615, a decoder 620, a message processor 625, and a controller 630.

The RF receiver 605 converts an RF signal from an antenna into a baseband analog signal.

The ADC 610 converts the analog signal from the RF receiver 605 into sample data.

The OFDM demodulator 615 processes, by Fast Fourier Transform (FFT), the sample data output from the ADC 610 and outputs data of a frequency domain.

The decoder 620 selects data (i.e., burst data) of subcarriers intended for reception among the frequency domain data from the OFDM demodulator 615, and demodulates and decodes the selected data according to a predefined modulation level (i.e., an MCS level).

The message processor 625 detects a packet (e.g., a MAC Packet Data Unit (PDU)) of a predetermined unit from the data from the decoder 620, and performs a header and error check for the detected packet.

At this time, if it is determined to be a control message through the header check, the message processor 625 interprets the control message according to a defined standard, and provides the interpretation result to the controller 630. That is, the message processor 625 extracts various kinds of control information from the received control message, and forwards the extracted information to the controller 630.

Referring to FIG. 6, the RS is now described below. In a capability negotiation process, the RS receives a response message (i.e., an SBC-RSP) to the control message (i.e., the SBC-REQ).

In this process, the message processor 625 receives the response message (i.e., the SBC-RSP) and, if reception succeeds, extracts control information (e.g., TLV information) from the message and forwards the extracted control information to the controller 630.

The controller 630 analyzes the control information and determines a capability negotiation success or failure. That is, if information of a bit 4 or a bit 4 and bit 5 is the same as that of the control message (i.e., the SBC-REQ), the BS determines that it recognizes a duplex mode of the RS.

Also, at the time of parameter configuration, the RS receives a control message (RS_Config-CMD). In this process, the message processor 625 receives the control message (RS_Config-CMD) and, if reception succeeds, extracts control information (e.g., parameter information (including EVM related information)) and forwards the control information to the controller 630. The controller 630 analyzes the control information and determines a parameter to be applied.

In an initial negotiation process or during operation, if using a centralized scheduling technique, the controller 630 can receive information transmitted by a BS, and set or reset RS use resource, power, etc.

Referring to FIG. 6, the BS is now described below. In a capability negotiation process, the BS receives a control message (i.e., an SBC-REQ).

In this process, the message processor 625 receives the control message (i.e., the SBC-REQ) and, if reception succeeds, extracts control information (e.g., TLV information) from the message and forwards the control information to the controller 630.

The controller 630 analyzes the control information and determines a duplex mode of the RS. And, the controller 630 generates control information (e.g., TLV information) for a response message.

Also, at the time of parameter configuration, the BS receives a response message (i.e., an ACK) in response to a control message (RS_Config-CMD) transmitted by the RS.

In this process, the message processor 625 receives the response message (ACK) and, if reception succeeds, extracts control information (i.e., information representing the ACK) from the message and forwards the control information to the controller 630.

The controller 630 analyzes the control information and determines that the RS successfully receives a parameter.

If there is a resource allocation request considering an EVM in an initial negotiation process from the RS (or, if the RS uses a centralized scheduling technique), the controller 630 sets (or resets) RS use resource, power, etc. using an EVM measurement result of the RS.

Further, an exemplary embodiment of the present invention proposes a capability negotiation process considering an EVM at the time of initial access of a full duplex RS and a working scheme considering an EVM characteristic during operation, to effectively support a full duplex RS system.

Through this, the full duplex RS can perform suitable frame structure selection, resource allocation, power control, etc. depending on a capability and EVM characteristic. And, an initial access method of an RS including a capability negotiation process and a working method considering an EVM during operation proposed in an exemplary embodiment of the present invention are described below.

Figure 7:
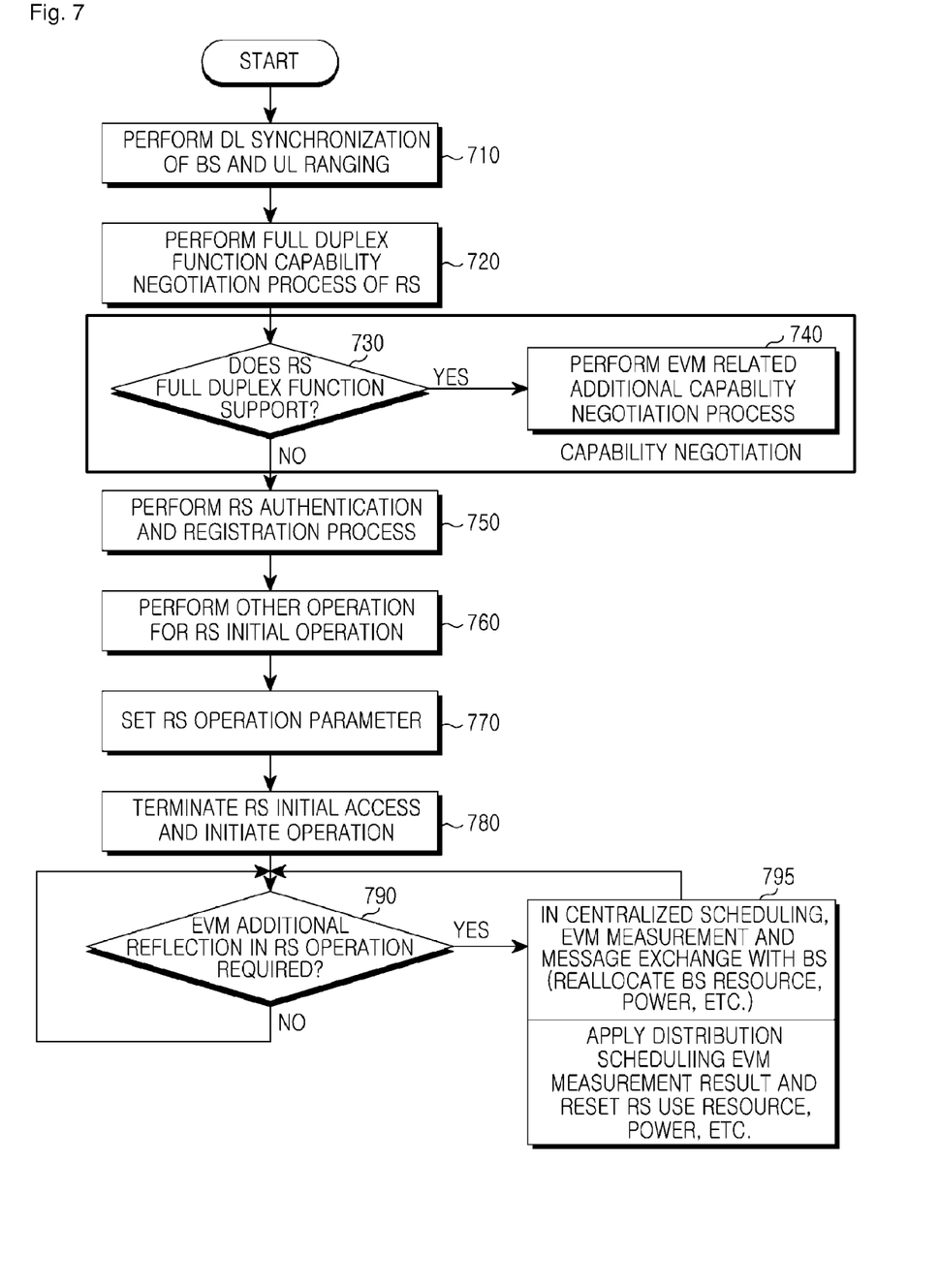
FIG. 7 is a flow diagram illustrating an initialization procedure including a capability negotiation process of a full duplex RS considering an Error Vector Magnitude (EVM) and a working process according to an exemplary embodiment of the present invention.

FIG. 7 is a flow diagram illustrating an initialization procedure including a capability negotiation process of a full duplex RS considering an EVM and a working process according to an exemplary embodiment of the present invention.

Referring to FIG. 7, it is an addition of capability negotiation for an EVM of a full duplex RS to the aforementioned capability negotiation process. In step 710, the RS performs synchronization acquirement and UL ranging using a DL of a BS.

After completing the synchronization acquirement, in step 720, the RS performs a full duplex function related capability negotiation process. For an RS supporting a full duplex function in step 730, an EVM related additional capability negotiation proposed in an exemplary embodiment of the present invention is performed in step 740. In this step, the RS measures an EVM of a transmit signal, determines the maximum transmit power and the maximum resource allocation size of the RS considering performance of an interference cancelation function, and performs capability negotiation with the BS using this. At this time, in a scheme in which the BS allocates a resource between the RS and an MS (or a subordinate station), i.e., in a centralized scheduling scheme of the IEEE 802.16j, the BS can determine resource allocation, the power for the communication between the RS and the MS, etc. using corresponding information.

After completing the capability negotiation process, in step 750, the RS performs an authentication and registration procedure, performs a remaining necessary process defined in the standard (e.g., the IEEE 802.16j) applied to the RS, finally sets an RS operation related parameter in step 770, and initiates an operation in step 780.

Not only in an initial capability negotiation process but also on need during operation in step 790, information exchange and resource reallocation related to an EVM between the BS and the RS can be additionally performed through a message exchange method, etc. in step 795. A sequence of each process is variable depending on the system standard applied.

If the BS performs scheduling (i.e., centralized scheduling), based on the IEEE 802.16j standard, in an RS initial network entry and performance process, the RS can request the BS not to use a specific resource of a specific frame so as to measure an EVM, receive data transmitted to a corresponding resource of a corresponding frame, and analyze the EVM.

Alternately, after receiving resource allocation information from the BS, the RS may grasp a resource not used by the BS and analyze an EVM in the same manner using this resource. The RS generates known data, allocates the known data to an allocated resource, transmits the data, and analyzes an EVM using a transmitted signal. Exchange of information on the EVM can be implemented at various levels according to need.

For example, the RS can exchange an EVM value for various combinations of a use bandwidth and an amplifier back-off value, and can initially exchange only a value for an EVM for an environment to be used at the time of initial operation, implement an operation, and, on need, exchange the EVM.

A case where the RS performs scheduling (i.e., distribution scheduling) in itself is given as follows.

This scheme is a scheme in which the RS schedules a resource to be used with an MS (or a subordinate station) in itself. In this scheme, scheduling is performed in the RS itself and thus, operation can be implemented in a scheme that the RS acquires and manages EVM information by itself.

At the time of initial access, till a capability negotiation procedure for an EVM, the same is performed. Subsequently, on need during working, the RS performs EVM measurement and performs resource allocation and power control in the RS itself using this.

Resource allocation using an EVM and power control are given as follows. The EVM can be influenced by non-linearity of an amplifier and thus, if a large level signal is input to the amplifier, a signal distortion is greatly generated by non-linearity of the amplifier compared to a case of inputting a small level signal. Due to this influence, an EVM of a transmission signal can increase.

A signal level is determined depending on whether any degree of the maximum transmit power and wholly available resources of a specific time is presently used. Thus, if an EVM of a low level is required for interference cancelation performance, the percentage of maximum transmit power and maximum available resource can be limited. And, a similar scheme is applicable even to other factors. If it is determined that EVM deterioration is generated due to any factor at the time of actual operation and there is a problem in a normal full duplex operation, the RS can stop a full duplex operation.

The information exchange and resource reallocation related to an EVM between the BS and the RS is necessary when the number of user and the capacity that the RS should support has been changed due to the requirement of operation of the RS.

In this case, the RS or the BS may take the EVM into consideration and the RS may apply the EVM for the operation of the RS or the RS may apply the EVM for the operation of the RS by the indication of the BS.

Figure 8:
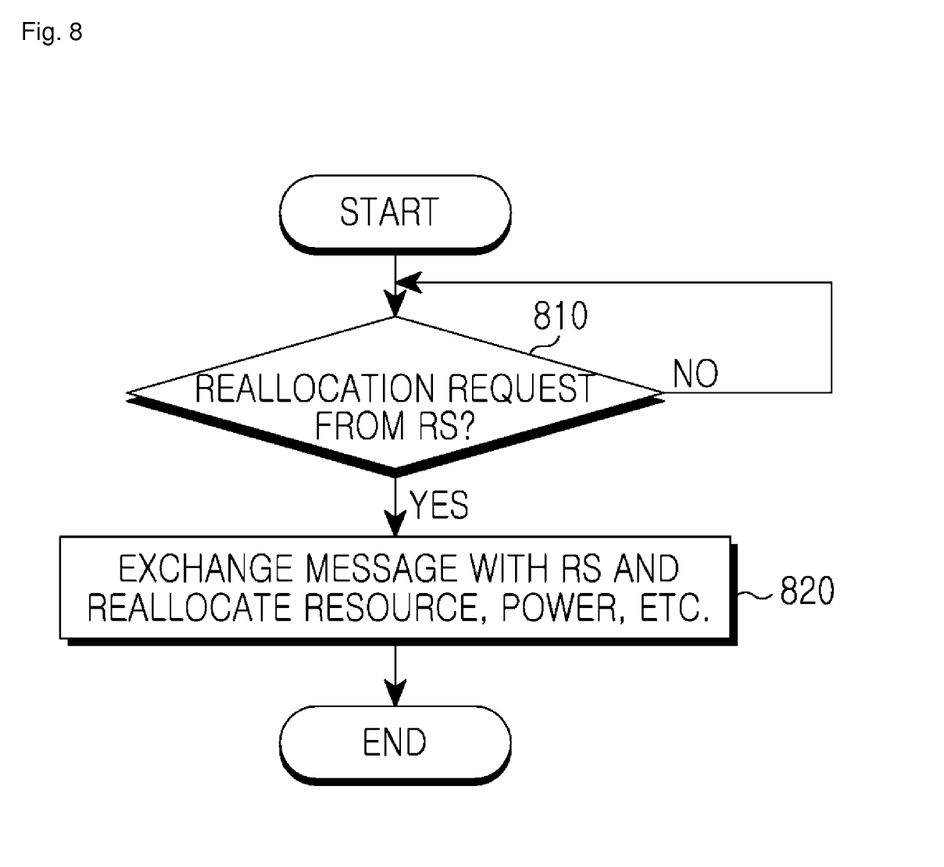
FIG. 8 is a flow diagram illustrating an operation process of a Base Station (BS) considering an EVM according to an exemplary embodiment of the present invention.

FIG. 8 is a flow diagram illustrating an operation process of a BS considering an EVM according to an exemplary embodiment of the present invention.

Referring to FIG. 8, if receiving a resource reallocation request considering an EVM from an RS in step 810, a BS exchanges a message with the RS and reallocates a resource and power for the RS in step 820.

A negotiation process considering an EVM, a resource and power reallocation request considering an EVM, and reallocation, etc. can use the aforementioned messages (i.e., the SBC-REQ, the SBC-RSP, the RS_Config-CMD, the RS_Capability_REQ, the RS_Capability_RSP), or can be performed through a definition of a different message.

An exemplary embodiment of the present invention proposes a capability negotiation process of, upon initial network entry, exchanging information on its full duplex support or non-support with a BS. By doing so, through an exemplary embodiment of the present invention, the BS can recognize a function of a full duplex RS and perform frame construction and resource allocation suitable to this and thus, there is an advantage of effectively operating the full duplex RS.

Also, an exemplary embodiment of the present invention provides a way in which an RS exchanges a measured EVM value with a BS in an initial capability negotiation process and, on need during working, exchanges the EVM value with the BS or makes use of the EVM value in the RS itself, and uses the EVM value in resource allocation, power control, etc. between the RS and an MS (or a subordinate station). Because of this, there is an advantage that a full duplex RS of the present invention can consider an EVM having significant influence on an operation of the full duplex RS and can perform frame construction suitable to the environment, resource allocation, and power control, thus being able to effectively operate.

While the invention has been shown and described with reference to certain preferred embodiments thereof, it will be understood by those skilled in the art that various changes in form and details may be made therein without departing from the spirit and scope of the invention as defined by the appended claims.

The invention claimed is:

1. A network entry method of a Radio Station (RS) using a full duplex mode, the method comprising:
performing a capability negotiation procedure with a Base Station (BS), the capability negotiation procedure comprising negotiating a capability for full duplex communication;
performing an authentication and registration procedure with the BS; and
performing an operation parameter configuration procedure with the BS, the operation parameter configuration procedure comprising configuring operation parameters for full duplex communication.

2. The method of claim 1, wherein performing the capability negotiation procedure with the BS comprises:
transmitting to the BS an RS capability request message comprising information representing a full duplex mode support or non-support, considering an Error Vector Magnitude (EVM) measured by the RS;
receiving a response message comprising information representing a full duplex mode support or non-support of the RS, in response to the RS capability request message; and
determining a capability negotiation success or failure based on the information comprised in the response message.

3. The method of claim 2, wherein the RS capability request message comprises the information representing the full duplex mode support or non-support of the RS considering the measured EVM and information representing if a frequency band used at the time of transmission/reception is the same band; and wherein the RS capability response message comprises the information representing the full duplex mode support or non-support of the RS considering the measured EVM and information representing if a frequency band used at the time of transmission/reception is the same band.

4. The method of claim 1, wherein the operation parameter configuration procedure comprises:
receiving a control message comprising an operation parameter, which considers a measured EVM and comprises a full duplex function, from the BS;

extracting the operation parameter from the control message and applying the extracted operation parameter; and transmitting to the BS a response message comprising the application result.

5. The method of claim 1, further comprising:

during an operation of the RS, measuring an EVM; and if the measured EVM requires applying in the RS operation, requesting the BS for reallocation for an RS resource or resetting a resource for the RS based on the measured EVM.

6. An apparatus of a Radio Station (RS) using a full duplex mode, the apparatus comprising:

a receiver configured to extract control information from a received control message;

a controller configured to perform a capability negotiation procedure with a Base Station (BS) using the control information, the capability negotiation procedure comprising negotiating a capability for full duplex communication, to perform an authentication and registration procedure with the BS, and to perform an operation parameter configuration procedure with the BS, the operation parameter configuration procedure comprising configuring operation parameters for full duplex communication; and a transmitter configured to receive information output by the controller and to generate and transmit a control message.

7. The apparatus of claim 6, wherein the controller performs the capability negotiation procedure with the BS, by transmitting to the BS a capability request message comprising a full duplex function considering an Error Vector Magnitude (EVM) measured by the RS, receiving a response message in response to the RS capability request message, and determining a capability negotiation success or failure based on information comprised in the response message.

8. The apparatus of claim 7, wherein the RS capability request message comprises information representing a full duplex mode support or non-support of the RS considering the measured EVM and information representing if a frequency band used at the time of transmission/reception is the same band; and wherein the RS capability response message comprises information representing a full duplex mode support or non-support of the RS considering the measured EVM and information representing if a frequency band used at the time of transmission/reception is the same band.

9. The apparatus of claim 6, wherein the controller sets an operation parameter comprising a full duplex function, by receiving a control message for the operation parameter considering a measured EVM and comprising the full duplex function from the BS, extracting the operation parameter from the control message and applying the extracted operation parameter, and transmitting to the BS a response message comprising the application result.

10. The apparatus of claim 6, wherein, during an operation of the RS, the controller measures an EVM and, if the measured EVM requires reflection in the RS operation, requests the BS for reallocation for an RS resource, or during an operation of the RS, the controller measures an EVM and, if the measured EVM requires applying in the RS operation, resets a resource for the RS based on the measured EVM.

11. A method of a Base Station (BS) for network entry of a Radio Station (RS) using a full duplex mode, the method comprising:

performing a capability negotiation procedure with the RS, the capability negotiation procedure comprising negotiating a capability for full duplex communication;

performing an authentication and registration procedure with the RS; and performing an operation parameter setting procedure with the RS, the operation parameter configuration procedure comprising configuring operation parameters for full duplex communication.

12. The method of claim 11, wherein performing the capability negotiation procedure with the RS comprises:

receiving an RS capability request message comprising a full duplex function considering a measured Error Vector Magnitude (EVM) from the RS;

determining a full duplex mode support or non-support of the RS based on information comprised in the RS capability request message; and transmitting the determination result in a response message responsive to the RS capability request message.

13. The method of claim 12, wherein the RS capability request message comprises information representing a full duplex mode support or non-support of the RS considering the measured EVM and information representing if a frequency band used at the time of transmission/reception is the same band; and wherein the RS capability response message comprises information representing a full duplex mode support or non-support of the RS considering the measured EVM and information representing if a frequency band used at the time of transmission/reception is the same band.

14. The method of claim 11, wherein the operation parameter setting procedure comprises:

transmitting to the RS a control message for an operation parameter considering a measured EVM and comprising a full duplex function;

receiving a response message responsive to the control message; and determining the application result of the operation parameter of the RS based on information comprised in the response message responsive to the control message.

15. The method of claim 11, further comprising:

if the RS requests the BS for reallocation of an RS resource because a measured EVM requires applying in an RS operation, reallocating a resource for the RS.

16. An apparatus of a Base Station (BS) for network entry of a Radio Station (RS) using a full duplex mode, the apparatus comprising:

a receiver configured to extract control information from a received control message;

a controller configured to perform a capability negotiation procedure with the RS using the control information, the capability negotiation procedure comprising negotiating a capability for full duplex communication, to perform an authentication and registration procedure with the RS, and to perform an operation parameter setting procedure with the RS, the operation parameter configuration procedure comprising configuring operation parameters for full duplex communication; and a transmitter configured to receive information output by the controller and to generate and to transmit a control message.

17. The apparatus of claim 16, wherein the controller performs the capability negotiation procedure with the RS, by receiving an RS capability request message comprising full duplex function information and considering a measured Error Vector Magnitude (EVM) from the RS, determining a capability negotiation success or failure of the RS based on information comprised in the RS capability request message, and comprising and transmitting the determination result in a response message responsive to the RS capability request message.

18. The apparatus of claim 17, wherein the RS capability request message comprises information representing a full duplex mode support or non-support of the RS considering the measured EVM and information representing if a frequency band used at the time of transmission/reception is the same band; and wherein the RS capability response message comprises information representing a full duplex mode support or non-support of the RS considering the measured EVM and information representing if a frequency band used at the time of transmission/reception is the same band.

19. The apparatus of claim 16, wherein the controller sets an operation parameter by transmitting a control message for an operation parameter considering the measured EVM and comprising a full duplex function to the RS, receiving a response message responsive to the control message, and determining the application result of the operation parameter of the RS based on information comprised in the response message responsive to the control message.

20. The apparatus of claim 16, wherein, if the RS requests the BS for reallocation for an RS resource because the measured EVM requires applying in an RS operation, the controller reallocates a resource for the RS.

* * * * *